Dec. 23, 1947.  S. A. ABRAHAMS ET AL  2,432,981
METHOD OF MAKING CALCAREOUS-SILICIOUS INSULATING UNITS
Filed Oct. 17, 1944

INVENTORS
Samuel A. Abrahams,
Rubin Lewon, August M. Dinkfeld
BY
Charles M. Fryer
ATTORNEY Patented Dec. 23, 1947

2,432,981

UNITED STATES PATENT OFFICE 2,432,981

METHOD OF MAKING CALCAREOUS-SILICIOUS INSULATING UNITS

Samuel A. Abrahams, Berkeley, Rubin Lewon, Orinda, and August M. Dinkfeld, Menlo Park, Calif., assignors, by mesne assignments, to The Paraffine Companies, Inc., San Francisco, Calif., a corporation of Delaware Application October 17, 1944, Serial No. 559,116

7 Claims. (Cl. 25—155)

Our invention relates to shaped or molded calcareous-silicious material, and more particularly to a relatively light weight material of this character set by application of heat and which is adapted for heat insulating purposes.

Preformed insulating blocks or slabs, of either flat or curved form, are widely employed commercially. For heat insulation up to about five hundred degrees Fahrenheit (500° F.), so-called eighty-five percent (85%) magnesia insulation is generally employed. Such material is not satisfactory for temperatures much above five hundred degrees Fahrenheit (500° F.) because it commences to disintegrate or break down at about that temperature. For higher temperatures, the shaped reaction product of a calcareous-silicious mixture set to a hard mass by a final indurating step, may be employed. This type of product, known to the trade as a "high temperature" insulation, will withstand temperatures well over one thousand degrees Fahrenheit (1000° F.), and is well known in the art, as is exemplified by the following patents: Belknap, 1,045,933, dated December 3, 1912; Teitsworth, 1,520,893, dated December 30, 1924; Teitsworth, 1,590,132, dated June 22, 1926; and Hutteman, et al., 1,932,971, dated October 31, 1933.

One general type of method heretofore employed for producing such so-called "high temperature" insulation from a mixture of calcareous and silicious materials, to which other materials, such as asbestos reenforcing fiber or the like may be added, is characterized by mixing the materials with water, with or without application of heat, usually accompanied by a more or less vigorous stirring or grinding of the materials in the aqueous vehicle; after a lapse of time, pouring the resultant mixture into a mold which approximates the shape of the final product desired (referred to in the trade as "pan casting"); subjecting the mixture while in the mold to a so-called indurating step, usually in an autoclave under an atmosphere of steam pressure, whereby the product undergoes a final chemical reaction which results in its setting to a firm or hard mass or cake that can be removed from the mold; drying the set mass substantially free of uncombined moisture; and then trimming the final product to shape over a large portion of its surface area, by a suitable machining operation. The machining operation is necessary because draft has to be provided in the mold to enable removal of the indurated mass; and such draft results in oversize of the final set product.

In this type of method, the reaction mixture is not compressed in any manner, but is set in situ after it is poured into the mold, which is desirable for the production of a comparatively light weight product. However, such method presents commercial disadvantages in addition to the necessity of the machining operation, because it requires an extremely large number of molds, inasmuch as the material is not self-supporting prior to the indurating treatment; and consequently for each shaped mass, there must be provided a mold therefor to support the mass in the indurating autoclave, which results in a material capital investment. Furthermore, the indurating treatment by this method requires a considerable length of time, as much as eight hours in many instances.

A variation in the method referred to is disclosed in the previously mentioned Teitsworth Patent No. 1,520,893 wherein the aqueous suspension of the calcareous-silicious materials, is not "pan cast," but is molded to shape in a filter press, which necessarily applies pressure to the mixture. This pressure treatment renders the resultant slabs self-supporting so that they may be conducted to the indurator without the necessity of carrying them in forms as in the "pan cast" method. However, such procedure is not desirable because the pressure treatment increases the density of the product by compacting it, and also requires a final machining operation for trimming the product to shape.

Our invention is concerned primarily with a procedure, analogous, to the "pan cast" method wherein the aqueous, calcareous-silicious mixture or suspension is set independent of application of pressure or in situ. It has as its objects, among others, the provision of an improved aqueous mixture of the type described and an improved method of preparing shaped masses from such mixture, both enabling the mixture to be pre-set in a mold, to a self-supporting mass in a comparatively short time with substantially no shrinkage, so that the final product will have substantially the exact shape imparted to it by the mold and also a mold smooth surface over substantially its entire surface area, thus eliminating the necessity of having to support such material in molds during the time it is being indurated and also eliminating the previously mentioned machining operation for trimming the product to size, which method is simple and economical to perform; and the provision of an improved final product resulting from such mixture and method. Other objects of our invention will become apparent from a perusal of the following description thereof.

In general, we have found that a calcareous-silicious mixture in water, containing the usual inert reenforcing fiber such as asbestos, undergoes an initial or incipient reaction which is accompanied by a thickening or swelling of the mass. If this mixture or slurry at substantially the point of incipient reaction, (which incipient reaction can be expedited by our preferred procedure to be subsequently described), is cast promptly into a mold to which heat is applied, the slurry can be pre-set in the mold in a relatively short time to a firm self-supporting mass with substantially no shrinkage, and may thus be removed from the mold in a comparatively short time. Accordingly, we remove the pre-set mass from the mold; and without supporting it in a form, place it in the previously mentioned indurator where it undergoes its final set.

Inasmuch as the materials undergoing reaction are promptly, from substantially the time or point of incipient reaction, cast or poured into the mold where it is pre-set, the setting reaction is allowed to occur substantially undisturbed from almost the time of commencement of the reaction of the materials in the water. This causes the bonding formation of the setting mass to occur undisturbed, throughout the entire course of setting, resulting in a final product having a greater strength per unit weight, compared to other "pan cast" products in which the reaction mixture is mixed for an undue length of time or allowed to stand too long before it is "pan cast." The former procedure appears to break up the bonding growth, resulting in weakening of the final product; while in the latter procedure, the bonding growth appears to be broken up by the pouring into the mold.

In our method, we allow almost all of the bonding growth or setting reaction to commence in the pre-setting mold, substantially immediately after the materials are mixed together in the water. This is an important factor which causes the relatively fast pre-setting to a firm self-supporting mass, of the materials in the mold, with substantially no shrinkage thereof in the mold or after the pre-set mass is removed from the mold, to provide a final product having substantially the exact shape of the mold and a mold smooth surface over substantially its entire surface area, thus eliminating the previously mentioned machining operations.

The mold in which the slurry is pre-set is preferably located at a fixed station; and the slurry to be set may be poured directly into the mold which shapes the slurry, and is preferably provided with a ram or ejector adjacent one end thereof to apply force against the pre-set mass and cause it to be ejected from the opposite end of the mold, after pre-setting of the mass. Thus, by the provision of a relatively small battery of such molds in a plant of relatively large capacity, the entire output of the plant may be accommodated. After pre-setting in the mold, and ejection of the pre-set mass therefrom, it is then indurated in the usual manner, and subsequently dried. We have found that because of our method, the indurating time may be cut down in many instances, to as low as two (2) hours, compared to the previously mentioned indurating time which is much longer, thus resulting in a further economy.

Preferably, the mold is elongated in shape, so that the pre-set mass may be pushed endwise therefrom. Thus, for example, by providing a tubular mold, a tubular final product may be made which is adapted for pipe covering. Such tubular final product will have mold smooth inner and outer arcuate surfaces; and since it will have substantially the exact shape of the mold, all that need be done to provide two matching halves which may be subsequently fitted about a pipe to be insulated, is to cut or split the tube longitudinally in half. In this connection, the product whether tubular or in slab or block form, is preferably molded so as to be slightly overlength; and to produce the proper length, we cut off either the end of final product corresponding to the end of the mold from which it is ejected, or both ends thereof should the ram end also require such cutting.

The accompanying drawings illustrate types of such pre-setting molds, and products shaped thereby. In such drawings.

Figure 1:
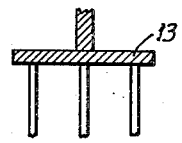
Fig. 1 is a schematic, vertical, cross-sectional view of a form of tubular mold for producing a pre-set tubular mass.
Figure 2:
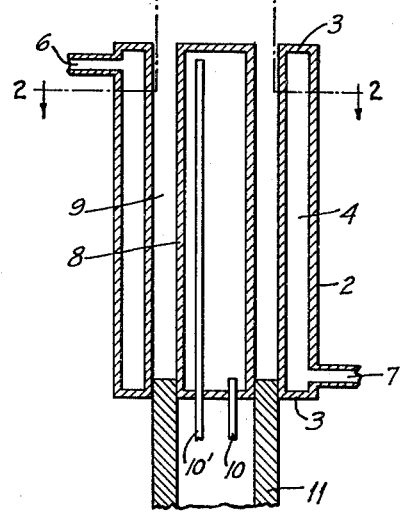
Fig. 2 is a horizontal section taken in planes indicated by line 2—2 in Fig. 1.
Figure 2:
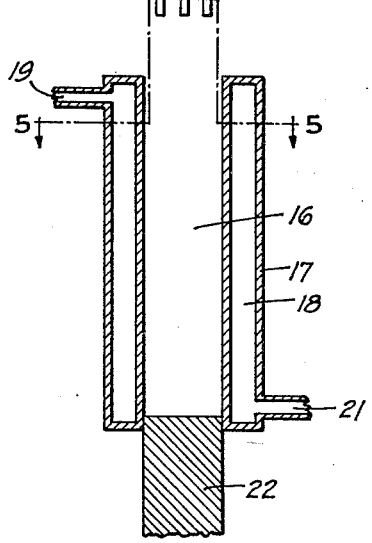
Figure 2:
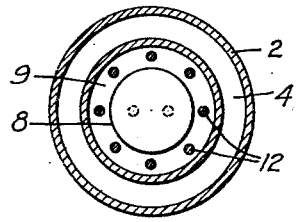

With reference to Figs. 1 and 2, a form of pre-setting mold for producing a tubular or pipe shaped pre-set mass, comprises a stationary cylinder 2 having closed ends 3, and containing a circumferential space 4 which provides a jacket for circulation of a heating medium, such as hot water or steam, and which during pre-setting of a mass in the mold insures thorough application of heat to the outside surface of such mass. This heating medium is introduced into jacket 4 through inlet pipe connection 6, and it is conducted from the jacket through outlet pipe connection 7. Any suitable heating and circulating means may be provided for causing heating of the heating medium, and flow thereof through jacket 4.

Located within cylinder 2 is a stationary, cylindrically shaped, hollow mandrel 8 which forms in cooperation with the inner wall of cylinder 2, a tubular space 9 into which the slurry of our invention may be poured. To insure thorough application of heat to the inside surface of the mass in the mold, we also circulate the heating medium through the inside of mandrel 8. This may be readily accomplished by means of heating medium inlet pipe 10, and an overflow pipe $10^1$ which terminates close to the upper end of the mold. Positioned at the lower end of space 9 is a tubular-like ram or ejector 11 which, when the mass in space 9 has been pre-set to a firm self-supporting cake, is moved upwardly by any suitable means (not shown) to eject the pre-set mass endwise from the mold, and is moved downwardly to its lower-most position when the mold is to be filled with slurry.

The slurry poured into the mold usually contains a suitable reenforcing fiber, preferably asbestos but which may be any other non-combustible fiber, such as other mineral fibers or glass fiber. We have found that if these fibers are arranged longitudinally in the general direction of the axis of the product, the strength of the product is enhanced. To accomplish this result, we preferably provide in association with the mold, a group of circumferentially arranged rods or fingers 12 which are adapted to be inserted into the mold space 9. These fingers are connected to a suitable cross-head 13 which in turn is connected to any suitable mechanism (not shown) for moving the fingers longitudinally into space 9 until the lower ends of such fingers are in close proximity to the ram 11; while at the same time, the fingers are given a limited but rapid back and forth movement. As a result, the fibers are more or less straightened out in the slurry in the mold.

When the slurry is first poured into the mold, the lower ends of fingers 12 are naturally out of the way so as not to interfere with the pouring; and the same condition obtains when ram 11 is moved upwardly to eject the pre-set mass from the mold. It is to be understood that the fingers are only brought into action for a short time of approximately one-half minute when the slurry is first poured into the mold.

Figure 4:
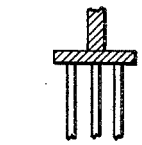
Fig. 4 is a view similar to Fig. 1, of a pre-setting mold adapted to shape a flat slab.
Figure 5:
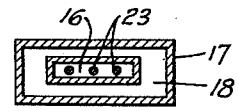
Fig. 5 is a horizontal section taken in planes indicated by line 5—5 in Fig. 4.

The mold of Figs. 4 and 5 is essentially the same as that previously described, except that it is designed for the shaping of a narrow, flat slab, and therefore, does not contain a stationary mandrel within space 16 in the mold. Such space is surrounded by stationary rectangularly shaped (in cross-section) mold body 17 having heating jacket 18 which communicates with inlet pipe connection 19 and outlet pipe connection 21. Ejector 22 is provided to accomplish the same result as ram 11; and fingers 23 serve the same function as fingers 12.

Our process is applicable to all of the various mixtures and starting materials referred to in the previously mentioned patents; it being important that the aqueous mixtures thereof be poured into the pre-setting mold substantially immediately after incipient reaction; so that most of the thickening or gelling of the mixture, resulting in the bonding growth during setting thereof will commence substantially at the time the mixture is poured into the mold. There are, however, various factors that enhance the reaction, and result in an improved final product which will now be discussed.

We have found that gelling or thickening of the slurry in the pre-setting mold can be enhanced with consequent increase in the speed of setting of the mass, by incorporating in the reaction mixture a relatively small proportion of an inorganic hydrophilic colloid or colloidal earth, such as bentonite, ehrenbergite, damonterolite, or montmorillonite, preferably bentonite. Organic hydrophilic colloids are not as satisfactory because they may burn out, at the temperatures to which the final product may be subjected. The colloidal earth imparts other advantages besides enhancing the gelling effect in the pre-setting mold. It minimizes loss of strength of the material, which might otherwise occur in the final product upon aging. This may be due to the colloidal earth plugging the surface pores of the material, thus providing protection against absorption or adsorption of moisture and carbon dioxide from the air, which cause formation of calcium carbonate, thus weakening the product.

Another advantage of the colloidal earth is that because of its pectizing property, it permits the employment of larger quantities of water in the reaction mixture, than could otherwise be utilized, thus enabling the manufacture of lighter weight products. In this connection, the density of the final product is a function of the quantity of water in the mixture, i. e., the more water for any given quantity and proportions of the dry ingredients, the lighter the final product, and vice versa.

The quantity of colloidal earth that should be utilized may vary. In general, enough of the earth should be employed to enhance the pre-setting but the quantity thereof should not be so great as to interfere with setting of the mass in the pre-setting mold. Too much colloidal earth will not only interfere or impede the setting, but may also result in shrinkage or warpage of the mass in the pre-setting mold, or after it is removed therefrom, which is obviously undesirable because such shrinkage would preclude formation of a final product having substantially the true shape of the pre-set mass. With these factors in mind, the quantity of colloidal earth may vary somewhat depending upon the ratio of water to solid ingredients, and the relative proportions of solid ingredients among themselves. In most cases, a proportion of colloidal earth amounting to from about one (1) to about four (4) percent by weight of the total quantity of dry solid ingredients will be satisfactory for the purposes pointed out. In any event, the quantity of colloidal earth should not, for best results, exceed five (5) percent of the total weight of solid ingredients.

We have also found that the pre-setting in the mold may be accelerated by incorporating a strong alkali in the reaction vehicle. We preferably employ a non-carbonate alkali metal alkali, such as sodium or potassium hydroxide, or sodium or potassium silicate. Ammonium hydroxide may be used but is not as effective. The quantity of strong alkali that may be employed is governed by the phenomena that too much alkali causes loss in strength of the final product upon aging, and cracking thereof when it is exposed to high temperatures. Also, too much alkali results in shrinkage of the product which is objectionable. Just enough alkali should be utilized to give the desired boost in setting of the reaction mixture in the pre-setting mold. We have found that about one-half ($\frac{1}{2}$) percent by weight of alkali, preferably sodium hydroxide, on the basis of the total amount of dry solid ingredients in the mixture, will produce the desired boost. Although such amount may be increased, care should be taken to avoid excessive amounts of alkali for the reasons stated. In this connection, an amount of alkali which is over two (2) percent by weight of the total amount of solid ingredients may prove detrimental.

In connection with utilization of the strong alkali to boost the pre-setting, the colloidal earth is important as it permits employment of the relatively small amounts of alkali without detriment to the physical properties of the final product. This is so because the alkali, if used alone, causes the final product to lose strength upon aging, as it enhances the adsorption or absorption of carbon dioxide from the atmosphere. The colloidal earth, inasmuch as it apparently plugs the pores of the final product provides protection against such carbon dioxide adsorption or absorption.

From the preceding, it is seen that our high temperature insulation is formed from an aqueous suspension or slurry of calcareous-silicious materials, and which contains a suitable reenforcing fiber such as the usual asbestos fiber. This suspension, preferably, contains the colloidal earth, and may also contain the strong alkali for the reasons stated. It is pre-set with substantially no shrinkage in a mold by application of heat to the mold, until the material has set to a relatively firm self-supporting mass which is ejected from the mold. Then the pre-set mass is indurated, and dried in a manner already known to the art. It is important for the reasons already mentioned that the reaction mixture be poured into the mold promptly substantially at the point of incipient reaction, so that most of the gelling or thickening thereof occurs in the pre-setting mold. If the reaction mixture is stirred too long or allowed to gel out of the mold, and then poured into the mold, the final product may not prove commercially satisfactory.

There are various factors that are important in obtaining a quick incipient reaction, so that the reaction mixture may gel quickly in the pre-setting mold. One of these is the choice of the calcareous material. We have found that for best results, the calcareous material should be so-called "hot" amorphous quicklime (calcium oxide) of low magnesia content—the lower the better. This is the most reactive calcareous substance we have found. Furthermore, the "hot" lime should be finely divided, as the more finely divided it is, the more intimate and faster will be the reaction with the silicious material.

Silicious materials vary in their reactivity with calcareous material; and to enhance the reaction with such calcareous material, we, therefore, employ those silicious materials which are highly reactive with calcareous material, and which, at the same time, are light enough in weight, so as not to increase unduly the density of the final product. As the preferred silicious material of this type, we employ raw diatomaceous earth which in its natural condition is finely divided. Such raw finely divided earth is more reactive with the calcareous material than coarser earths, or fluxed or calcined earths. Preferably, the earth should not be ground because this seems to destroy the cellular structure of the earth which makes for lightness of the final product.

Another feature with respect to the earth is that its natural moisture content should be relatively low, preferably not over four (4) percent of the weight of the earth. This is so because, as will be subsequently explained, we preferably dry mix the calcareous and silicious materials; and if there is too much moisture in the earth, a reaction thereof may commence with the calcareous material, which is undesirable before the water is added, as we desire as much of the reaction as possible to occur initially in the pre-setting mold. However, earths with moisture contents of as high as seven (7) percent may be utilized if too large a dry batch is not mixed at one time, and if the moisture in the earth is compensated for by lessening the quantity of water to be added to the mix.

In connection with mixing of the materials, we have found that for best results, the calcareous material should be first intimately and thoroughly dry mixed with the silicious material, by any suitable means. Preferably, the dry reenforcing fiber is also incorporated in the mixture during the dry mixing of the calcareous and silicious materials; and if the colloidal earth is employed, it is also preferably intermixed thoroughly in dry condition, with the other ingredients during such dry mixing. However, the colloidal earth may be dispersed in the water to which the dry mixture is subsequently added, especially when an extremely light weight product is to be made. The strong alkali to give the boost in pre-setting is preferably dissolved in the water, but may be included in the dry mixture.

The mixing should be of such character as not to cause material disintegration or grinding of the materials, but sufficient to cause thorough intermingling thereof and intimate contact among the materials, especially the calcareous material and the silicious material. Also, such mixing should be conducted in an atmosphere substantially free of excessive moisture, to preclude moisture adsorption or absorption, which would subsequently impede the efficacy of the reaction when water is included in the mixture. The dry mix may be prepared beforehand in batches, but the batches should not be so large that they will stand around too long because then the reactive materials lose some of their reactivity when water is subsequently added thereto; and this would impede the setting in the pre-setting mold. For this reason, we have found that it is preferable to prepare batches which will not stand around for much longer than two (2) hours.

After dry mixing of the solid materials, they are next ready for mixing with the water. We have found that the hotter the water the faster will be the reaction and the faster will be the set in the pre-setting mold. We, therefore, add the dry mix to water initially heated to substantially boiling temperature, or as close to boiling temperature as possible. In this connection, we mix the materials thoroughly with the water—which operation is solely for mixing to obtain thorough intermingling of the entire mass; and to prevent cooling, we heat the water during the mixing operation to maintain as much as possible its original temperature. This heating may be performed by introducing live steam directly into the aqueous slurry, or by employing a steam jacketed kettle, or any suitable vessel heated at any suitable temperature to maintain the water as hot as possible during the entire mixing operation. Temperatures lower than that of boiling water may be employed, but then the reaction will not be as fast, and the setting in the pre-setting mold will be slower.

In the mixing operation with the water, the resultant slurry thickens as a result of the reaction which occurs among the materials. As previously stated, we desire as much as possible of such thickening effect to occur in the pre-setting mold; so that bonding of the mass which results in the setting can occur undisturbed substantially throughout the entire time after the reaction commences, as this results in the final product having a stronger physical structure. Therefore, after the water has been thoroughly mixed with the solid ingredients, we promptly transfer the mass into the pre-setting mold; the sooner this is done the better.

If the transfer of the slurry into the pre-setting mold, is made much after four (4) minutes from the time water is first included in the mixture, the setting of the mass in the pre-setting mold will become slower. We, therefore, preferably pour the slurry into the pre-setting mold within a period not over substantially four (4) minutes after the preparation thereof; and to preclude mixed slurries from standing around too long, we preferably mix only sufficient of the dry mix with a sufficient quantity of water for those of the pre-setting molds which are available at the time. For example, if only one mold is available, then we prepare a quantity of slurry comparable to the capacity of that mold. If a plurality of molds are available, then the slurry is prepared in a quantity just sufficient to fill such plurality of available molds. By employing a battery of pre-setting molds, the process may be made more or less continuous. As was previously pointed out, the density of the final product will be determined by the quantity of water employed in the slurry for any given total quantity and proportions of solid ingredients—the more water, the lighter the final product, and vice versa.

The pre-setting mold, as previously described, contains a jacket through which live steam or any other suitable heating medium is circulated, to maintain the mass in the mold heated during the pre-setting thereof to a firm cake, as such pre-setting is facilitated by the heat application. We preferably maintain the temperature of the pre-setting mold as close to that of boiling water as possible, as approximately this temperature has been found to produce the best results. Higher temperatures may be employed and will produce a faster set, but then the surface of the setting mass may become pitted by blow holes. Lower temperatures applied during pre-setting will produce a better surface but then the pre-setting may become too slow. A temperature range of between one hundred and eighty degrees Fahrenheit (180° F.) and the boiling temperature of water will be satisfactory for most purposes.

After the mass has set to a firm self-supporting cake in the pre-setting mold, it is easily ejected therefrom by the movable ram. In this connection, the mass will set to a self-supporting cake within a period not over substantially thirty (30) minutes; generally in about fifteen (15) to thirty (30) minutes, depending upon the proportions and character of the materials in the mix, and the various other factors discussed previously. Ejection of the pre-set mass from the mold is easily accomplished because even though it is self-supporting, it is still moist; and the moisture provides sufficient lubrication to permit such ejection without damage to the pre-set mass.

Figure 3:
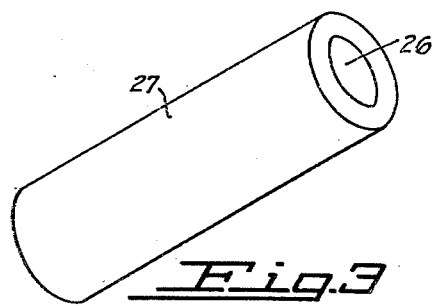
Fig. 3 is a perspective view of the tubular mass resulting from the mold of Figs. 1 and 2.
Figure 6:
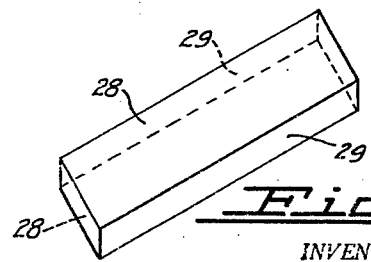
Fig. 6 is a perspective view of the resultant flat slab shaped by the mold of Figs. 4 and 5.

As was previously mentioned, substantially no shrinkage occurs in the pre-setting mold, or after the mass is ejected therefrom. In cases where some slight shrinkage might occur, it will rarely be over three-fourths of a percent (¾%) by volume, which is not sufficient to preclude production of a final product which has substantially the exact shape of the mold, has the mold smooth surface over substantially its entire area, and which requires no machining operations to trim it to shape. With respect to the tubular product illustrated by Fig. 3, both its inner arcuate surface 26 and its outer arcuate surface 27 are mold smooth and true to shape. As a result, it will provide a final pipe covering after it has been indurated and dried, by cutting it longitudinally in half, and fitting the halves around a pipe of appropriate size. The flat slab of Fig. 6 has mold smooth opposite side surfaces 28 and side edge surfaces 29, and may be used for so-called "block" insulation. The only portion of a product molded in the manner described, which is not smooth-surfaced, is at the exposed end thereof which is first ejected from the mold. However, this is immaterial because, as previously related, the final product is preferably made slightly overlength; and such end or both ends thereof are generally cut off to produce the desired length.

After ejection from the mold, the self-supporting pre-set mass is now ready for induration which is preferably accomplished in the usual manner as heretofore taught in the art, namely, by application of heat in a saturated atmosphere of moisture, effected by placing the product in an autoclave into which steam under pressure is introduced. This procedure produces the final reaction in the product. The autoclave temperature is primarily determined by economic factors, namely, the cost of steam and high pressure equipment, but too low a temperature should not be employed because this would increase the time of autoclave treatment, and would not provide as strong a final product. Also, the induration treatment, accomplished in the moisture saturated atmosphere, should be such as to avoid substantial evaporation of moisture from the product while it is undergoing induration. Otherwise, proper final bonding of the set mass may not obtain. We have found that satisfactory results may be obtained during the autoclave induration, at a steam pressure of between one hundred (100) and one hundred and twenty-five (125) pounds per square inch which corresponds to a temperature of between three hundred and thirty-eight and three hundred and fifty degrees Fahrenheit (338° F. to 350° F.). This pressure and corresponding temperature may be varied, as is taught by the art.

Under the preferred conditions noted, our product need not be indurated much over two and one-half (2½) hours. This time is much faster than heretofore employed in the art, due to the fact that the reaction among the ingredients therein is not disturbed from substantially the time these ingredients are first caused to react, and also to our pre-setting treatment by which the reaction is caused to proceed promptly after mixing of the ingredients, while they remain in situ or in an undisturbed state.

After the indurating treatment, the product is removed from the indurator, and is next dried in the usual manner, namely, either by application of artificial heat or by natural drying, until all uncombined moisture is driven off. To expedite the drying operation, we preferably dry our product in any conventional dryer at a temperature of about three hundred and fifty degrees Fahrenheit (350° F.) until it is free of uncombined moisture, which will occur in about twenty-four (24) hours. The resultant product is an extremely strong light weight heat insulating material that will easily withstand temperatures up to twelve hundred degrees Fahrenheit (1200° F.).

As was previously mentioned, the density of the final product for any given quantity of solid ingredients, is a function of the quantity of water employed in the mix, the more water the less the density, and vice versa. However, the choice of solid ingredients, and their proportions among themselves, are also factors in fixing the density for any given quantity of water; particularly with respect to the character of and quantities of silicious material employed. We have found that for best results, the dry solids to water ratio of the slurry to which our invention relates should be about one (1) part of dry solids by weight to about two and one-half (2½) to about six (6) parts of water by weight. This will produce a dry final product which will vary from about ten (10) to about twenty (20) pounds per cubic foot in density depending upon the proportions of the solid ingredients and their character.

Our preferred products, which will have a density varying from about twelve (12) to about seventeen (17) pounds per cubic foot, are made from the following ingredients in proportions in parts by weight, and according to our preferred procedure, in which diatomaceous earth, quicklime, fiber, and colloidal earth are first intimately dry mixed, and then added to hot water containing a relatively small percentage of strong alkali as a pre-setting accelerator; the resultant slurry being pre-set in a mold and treated in the manner described:

| | |
|---|---|
| Raw uncalcined-diatomaceous earth | 40 to 60 |
| Quicklime | 25 to 40 |
| Reenforcing fiber (preferably asbestos) | 10 to 15 |
| Colloidal earth | 1 to 4 |
| Pre-setting accelerator (sodium hydroxide) | ¼ to ¾ |

The water to dry solids ratio may vary from about two and one-half (2½) to about six (6) parts of water by weight to one (1) part by weight of the total amount of dry solids. If the colloidal earth and the pre-setting accelerator are omitted, the range of proportions of the other ingredients are still approximately the same.

The product we have found most satisfactory from a commercial viewpoint is made from the following ingredients in about the following parts by weight, and according to our preferred procedure:

| | |
|---|---|
| Raw uncalcined-diatomaceous earth | 53.0 |
| Quicklime | 34.5 |
| Asbestos fiber | 10 |
| Bentonite | 2 |
| Sodium hydroxide (presetting accelerator) | ½ |

About thirty-five (35) pounds of the dry solids are mixed with about seventeen (17) gallons of boiling water; a ratio of about one hundred (100) parts of dry solids by weight to about four hundred (400) parts of water by weight. Preferably, all the dry ingredients, except the sodium hydroxide, are first intimately dry mixed; while the sodium hydroxide is dissolved in the boiling water to which the mixture of the other dry ingredients is added and mixed for about two (2) minutes in the boiling water while the temperature of the water is maintained. The resultant slurry is then transferred immediately into the pre-setting mold maintained at an elevated temperature of between two hundred and two hundred and twelve degrees Fahrenheit (200° F. to 212° F.), pre-set in such mold for about twenty-two (22) minutes, after which it is ejected therefrom in firm self-supporting form, indurated in an autoclave for about two (2) hours under about one hundred and twenty-five (125) pounds steam pressure—equivalent to about three hundred and fifty degrees Fahrenheit (350° F.); and finally dried free of uncombined moisture. In this formula, the sodium hydroxide may be omitted without altering the characteristics of the final product, but if omitted, the pre-setting time should be increased slightly.

The resultant product has a density of about fourteen (14) pounds per cubic foot, is strong and can withstand a maximum temperature of about twelve hundred degrees Fahrenheit (1200° F.). Although weighing only about fourteen (14) pounds per cubic foot, its strength is comparable to present day commercial "high temperature" insulating materials having a density averaging from twenty-three (23) to twenty-eight (28) pounds per cubic foot; and it has a relatively low heat conductivity coefficient equal to or better than present standard eighty-five percent (85%) magnesia insulation, and much better than standard high temperature insulation produced commercially today.

We claim:
1. The method of making a light weight mass of porous heat insulating material set substantially without shrinkage from a relatively thin aqueous slurry containing reactable calcareous and silicious materials; which comprises pouring said slurry into a mold prior to substantial thickening thereof; rapidly pre-setting said slurry to a firm self-supporting mass in said mold which shapes said self-supporting mass, said pre-setting being effected by applying heat to the slurry and in addition applying heat to the mold to maintain the heated condition of the slurry and cause substantially all thickening of the slurry to said self-supporting mass to occur substantially undisturbed in said mold; said heating of the mold being maintained during the pre-setting period whereby the pre-setting to said self-supporting mass is completed in a comparatively short time; after the slurry has pre-set to said self-supporting mass removing the self-supporting mass from the mold; and then subjecting the self-supporting mass to an indurating treatment out of the mold.

2. The method of making a light weight mass of porous heat insulating material set substantially without shrinkage from a relatively thin aqueous slurry containing reactable calcareous and silicious materials; which comprises employing a battery of pre-setting molds, each of which is adapted to shape a mass of said material; pouring said slurry into said molds prior to substantial thickening thereof; rapidly pre-setting said slurry to a firm self-supporting mass in each of said molds, said pre-setting being effected by applying heat to the slurry and in addition applying heat to each of said molds to maintain the heated condition of the slurry and cause substantially all thickening of the slurry to said self-supporting mass to occur substantially undisturbed in said molds; said heating of the molds being maintained during the pre-setting period whereby the pre-setting to said self-supporting masses is completed in a comparatively short time; after the slurry has pre-set to said self-supporting masses removing the self-supporting masses from the molds; and then subjecting the self-supporting masses to an indurating treatment out of the molds.

3. The method of making a light weight mass of porous heat insulating material set substantially without shrinkage from a relatively thin aqueous slurry containing reactable calcareous and silicious materials; which comprises utilizing an axially elongated mold; pouring said slurry into said mold prior to substantial thickening thereof; rapidly pre-setting said slurry to a firm self-supporting mass in said mold which shapes said self-supporting mass and from which said self-supporting mass can be extruded endwise whereby substantially all of said mass will have mold-smooth surfaces, said pre-setting being effected by applying heat to the slurry and in addition applying heat to the mold to maintain the heated condition of the slurry and cause substantially all thickening of the slurry to said self-supporting mass to occur substantially undisturbed in said mold; said heating of the mold being maintained during the pre-setting period whereby the pre-setting to said self-supporting mass is completed in a comparatively short time; after the slurry has pre-set to said self-supporting mass applying force against the pre-set mass adjacent to one end of the mold to extrude such pre-set mass endwise from the opposite end of the mold; and then subjecting the self-supporting mass to an indurating treatment out of the mold.

4. The method of making a light weight mass of porous heat insulating material having a density of about ten (10) to about twenty (20) pounds per cubic foot and which is set substantially without shrinkage from a relatively thin aqueous slurry containing reactable calcareous and silicious materials, and also reenforcing fiber for the final product, the proportions being about one (1) part of dry solids by weight to about two and one-half (2½) to about six (6) parts of water by weight; which comprises utilizing an axially elongated mold; pouring said slurry into said mold prior to substantial thickening thereof; rapidly pre-setting said slurry to a firm self-supporting mass in said mold which shapes said self-supporting mass and from which said self-supporting mass can be extruded endwise whereby substantially all of said mass will have mold-smooth surfaces, said pre-setting being effected by applying heat to the slurry and in addition applying heat to the mold to maintain the heated condition of the slurry and cause substantially all thickening of the slurry to said self-supporting mass to occur substantially undisturbed in said mold; said heating of the mold being maintained during the pre-setting period whereby the pre-setting to said self-supporting mass is completed in a comparatively short time; the temperature being high enough to expedite the pre-setting but sufficiently low to preclude substantial formation of blow-holes in the mold-smooth surface of the pre-set mass; after the slurry has pre-set to said self-supporting mass applying force against the pre-set mass adjacent one end of the mold to extrude such pre-set mass endwise from the opposite end of the mold; and then subjecting the self-supporting mass to an indurating treatment out of the mold.

5. The method of making a light weight mass of porous arcuately shaped insulating material adapted for a pipe covering half and which is set substantially without shrinkage from a relatively thin aqueous slurry containing reactable calcareous and silicious materials; which comprises utilizing a tubular mold; pouring said slurry into said mold prior to substantial thickening thereof; rapidly pre-setting said slurry to a firm self-supporting mass in said mold which shapes said self-supporting mass in the form of a tube and from which said tube can be extruded endwise whereby both the inner and outer surfaces of said pre-set tubular mass will be substantially mold-smooth, said pre-setting being effected by applying heat to the slurry and in addition applying heat to the mold to maintain the heated condition of the slurry and cause substantially all thickening of the slurry to said self-supporting mass to occur substantially undisturbed in said mold; said heating of the mold being maintained during the pre-setting period whereby the pre-setting to said self-supporting mass is completed in a comparatively short time; after the slurry has pre-set to said self-supporting tubular mass extruding said tubular mass endwise from the mold; subjecting the self-supporting tubular mass to an indurating treatment out of the mold; and dividing the tubular mass longitudinally in two parts to provide fitting pipe covering halves true to shape with each half having substantially mold-smooth inner and outer surfaces.

6. The method of making a light weight mass of porous heat insulating material set substantially without shrinkage from a relatively thin aqueous slurry containing reactable calcareous and silicious materials, and also reenforcing fiber for the final product; which comprises utilizing an axially elongated mold; pouring said slurry into said mold prior to substantial thickening thereof; rapidly pre-setting said slurry to a firm self-supporting mass in said mold which shapes said self-supporting mass and from which said self-supporting mass can be extruded endwise whereby substantially all of said mass will have mold-smooth surfaces, said pre-setting being effected by applying heat to the slurry and in addition applying heat to the mold to maintain the heated condition of the slurry and cause substantially all thickening of the slurry to said self-supporting means to occur substantially undisturbed in said mold; at the time the slurry is first poured into the mold arranging the reenforcing fiber in the slurry generally longitudinally of the axis of the mold to enhance the strength of the final product, by inserting elongated members into the slurry while at the same time imparting to them a limited but rapid back and forth movement for a relatively short time; said heating of the mold being maintained during the pre-setting period whereby the pre-setting to said self-supporting mass is completed in a comparatively short time; after the slurry has pre-set to said self-supporting mass extruding the mass endwise from the mold; and then subjecting the self-supporting mass to an indurating treatment out of the mold.

7. The method of making a light weight mass of porous heat insulating material set substantially without shrinkage from a relatively thin aqueous slurry containing reactable calcareous and silicious materials; which comprises utilizing a mold having mold walls adapted to contact substantially the entire surface area of material to be molded and thus shape said material substantially to final contour; pouring said slurry into said mold prior to substantial thickening thereof; rapidly pre-setting said slurry to a firm self-supporting mass in said mold which shapes said self-supporting mass substantially to its final contour, said pre-setting being effected by applying heat to the slurry and in addition applying heat to the mold to maintain the heated condition of the slurry and cause substantially all thickening of the slurry to said self-supporting mass to occur substantially undisturbed in said mold; said heating of the mold being maintained during the pre-setting period whereby the pre-setting to said self-supporting mass is completed in a comparatively short time; after the slurry has pre-set to said self-supporting mass removing the self-supporting mass from the mold; and then subjecting the self-supporting mass to an indurating treatment out of the mold.

SAMUEL A. ABRAHAMS.
RUBIN LEWON.
AUGUST M. DINKFELD.

REFERENCES CITED

The following references are of record in the file of this patent:

UNITED STATES PATENTS

| Number | Name | Date |
| --- | --- | --- |
| 683,337 | Schulthess | Sept. 24, 1901 |
| 965,007 | Pauly | July 19, 1910 |
| 1,861,727 | Tuerck | June 7, 1932 |
| 1,045,933 | Belknap | Dec. 3, 1912 |
| 1,107,431 | Malinovszky | Aug. 18, 1914 |
| 1,569,755 | Irvin | Jan. 12, 1926 |
| 1,666,936 | Kern | Apr. 24, 1928 |
| 1,812,306 | Russ | June 30, 1931 |
| 1,932,971 | Huttemann et al. | Oct. 31, 1933 |
| 2,243,369 | Albert | May 27, 1941 |